Nov. 7, 1967 W. C. KAHN 3,351,738
PIPE HEATING ARRANGEMENT
Filed July 26, 1963 2 Sheets-Sheet 1
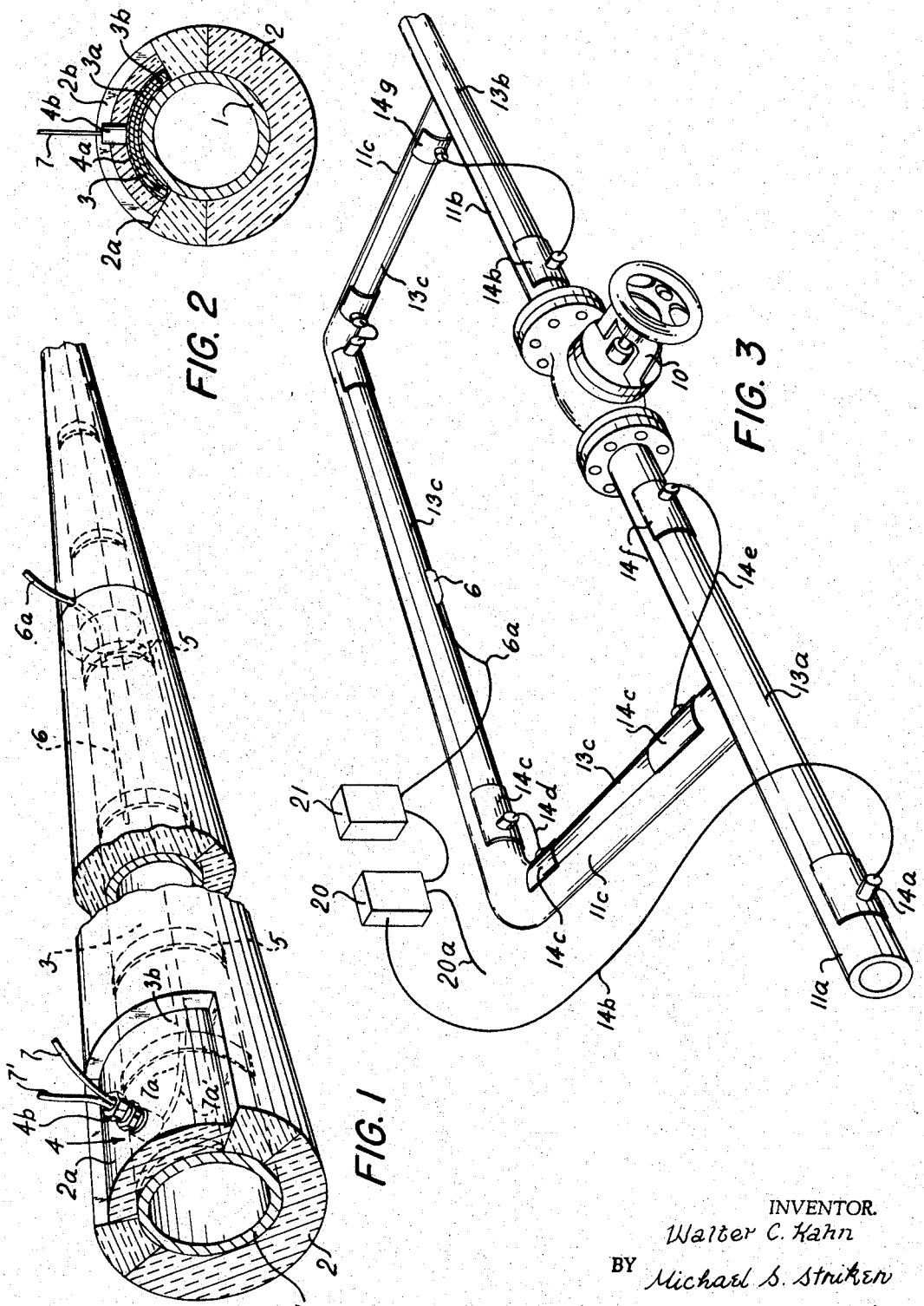
INVENTOR.
Walter C. Kahn
BY Michael S. Striker
ATTORNEY

United States Patent Office 3,351,738
Patented Nov. 7, 1967

3,351,738
PIPE HEATING ARRANGEMENT
Walter C. Kahn, 1 Berndale Drive,
Westport, Conn. 06880
Filed July 26, 1963, Ser. No. 297,875
3 Claims. (Cl. 219—301)

The present invention relates to a pipe heating arrangement, and more particularly to an arrangement for heating pipes through which a fluid or liquid flows so that the fluid is maintained at a desired temperature, or freezing of a liquid in a pipe is prevented.

It is known to provide electric heating elements on pipes, and more particularly on pipes enveloped in a thermal insulating material. However, the arrangements of the prior art have the disadvantage that narrow heating elements disposed between the pipe and the insulating material, create longitudinal air gaps between the pipe and the insulating material. Furthermore, it is necessary to connect a heating element which has terminals at the ends thereof at both ends of the pipe to a source of voltage, so that access to both pipe ends, and to both ends of the heating element is necessary.

It is one object of the present invention to overcome the disadvantages of the prior art, and to provide a heating arrangement for pipes in which thermal insulating material can envelop the pipe in such a manner that no air gap is formed between the insulating material and the pipe.

Another object of the present invention is a heating arrangement in which only one point of a pipe, or of an entire pipe system comprising pipe sections and branch pipes, need be accessible for connecting heating elements extending along the pipes, to switching means, or a source of voltage.

Another object of the present invention is to provide a heating arrangement in which the temperature of a fluid flowing in a pipe system is controlled in accordance with the lowest temperature possible in any pipe of the system, irrespective of the temperature of a fluid entering the pipe system.

Another object of the invention is to control the temperature of a fluid flowing in a branch pipe system in accordance with the temperature of fluid in a closed pipe section in order to prevent temperature control depending on the temperature of a fluid flowing into the pipe system at a temperature higher than the temperature of the fluid in other parts of the pipe system.

Another object of the present invention is to control the heating of larger and smaller pipes in such a manner that the temperature of the fluid in the pipe sections is maintained at the same constant level irrespective of the diameter of the pipe sections, and the amount of fluid flowing therethrough.

With these objects in view, the present invention relates to a pipe heating arrangement in which a thin flat heating strip is used for heating pipe means containing a fluid.

In one embodiment of the present invention, a thin flat elongated heating strip including a thin resistance element, a pair of elongated electrodes electrically connected with said heating element, and connector means at one end of the strip and having terminals connected with the electrodes, is placed on the outer surface of pipe means, and attached to the same to extend along the entire length of the pipe means.

The connector means may be located at the end of the pipe means, or at the particularly accessible point of the pipe means, so that the source of voltage has to be connected only to one point of the pipe means to which access is easily possible. Since the heating strip extends along the pipe for any desired length, the entire pipe is heated, although for the purpose of making electrical connections, or repairs, only a small portion of the pipe has to be arranged to be accessible to an operator. This is particularly advantageous if the heated pipe is buried in the ground below the surface.

The switching means of the heating element is preferably controlled by a thermostat, which may be controlled by a thermostat bulb placed on the outer surface of a pipe and within the thermal insulating material.

According to one embodiment of the invention, the thermostat bulb is not placed on a pipe through which the fluid flows, but on a "dummy" pipe section which is closed and filled with stationary fluid. In branched piping in which fluid may flow in some branch lines, and not in others, the temperature of the entire pipe system is controlled in accordance with the low temperature of the non-moving fluid in the closed pipe whereas if the thermostat bulb would be mounted on one of the branches in which fluid is flowing, the thermostat may switch off the heating means when fluid having a high temperature enters the respective pipe, causing the fluid in another pipe to freeze.

When a pipe system comprises a number of pipe sections, which may be separated by valves, or pipe joints, connector means may be provided at both ends of the heating strips of selected pipe sections, and jumper wires may be provided for connecting the connectors of heating strips on different pipe sections. However, only one connector at one point of one pipe section has to be connected to the voltage source, or to thermostat controlled switching means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective view illustrating a pipe heating arrangement according to the present invention;

FIG. 2 is a cross sectional view illustrating an insulated pipe heated in accordance with the present invention;

FIG. 3 is a perspective view illustrating one embodiment of the invention;

Figure 4:
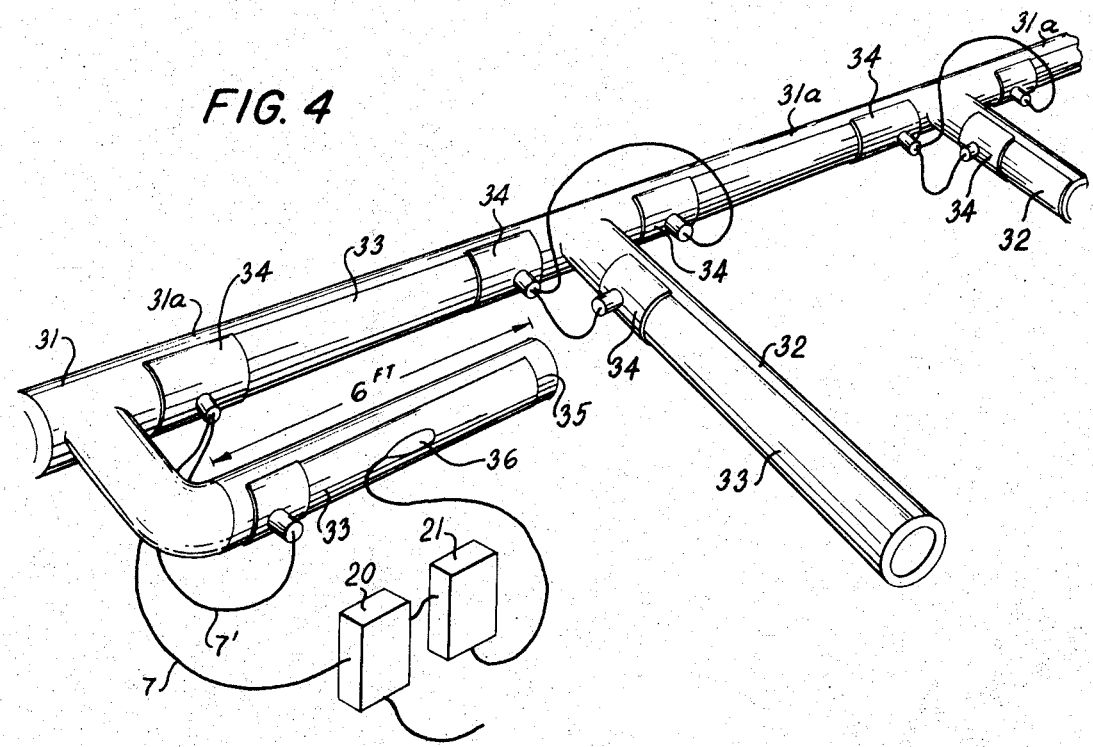
FIG. 4 is a perspective view illustrating another embodiment of the invention.

Referring now to the drawings, and more particularly to FIGS. 1 and 2, a pipe 1 is enveloped by a thermal insulating material 2 which has a cutout 2a which may be located at the end of the insulated pipe.

A thin flat elongated heating strip 3 is disposed on the outer surface of pipe 1 within the insulating material 2.

Heating strip 3 has two outer layers of an insulating material, for example Teflon or Aclar, heat bonded to each other and to a glass-asbestos layer which is sandwiched between the outer layers and protected by the same from heat and moisture. A conductive resistance layer 3a is embedded in the glass-asbestos fiber layer. Parallel to the lateral longitudinal edges of the strip, two band-shaped copper electrodes 3b are disposed in conductive contact with the lateral portions of the resistance element 3a and covered by the glass-asbestos layer. A voltage applied to electrodes 3b causes a current to flow transversely to the direction of the strip across the resistance element 3a. Consequently, the same heat per unit of area regardless of the length of the strip is produced when current flows through the resistance element 3a. Heating strips of this type but without the Teflon or Aclar cover are known, and are not an object of the present invention.

U.S. Patents 2,952,761, 2,803,566 and 3,002,862 disclose related subject matter.

A connector means 4 is provided at the end of strip 3 and includes a flexible bag-shaped insulating end piece 4a to which a threaded connector piece 4b is attached into which wires 7, 7' are inserted. A pair of wires 7a is connected to the ends of a wire 7, and a pair of wires 7a' is connected to the wire 7'. Wires 7a, 7a' are connected to each electrode 3b, only one wire of each pair being visible in FIG. 1. When a voltage source is connected to wire 7, current flows through the electrodes 3b, and across the heating element 3a. Wire 7' may be used for connecting two heating elements.

Annular straps 5 embrace pipe 1 and heating strip 3 to hold the same in place. The width of heating strip 3 is, for example, 3″ which is less than the circumference of pipe 1, so that the insulating material 2 is in direct contact with the greater part of the outer surface of pipe 1, particularly since the heating strip is very thin, for example less than 1/32″.

Therefore, the usual oversize insulation is not required, and there are no inefficient air spaces between the insulating material 2 and the pipe 1. Tracer pipes or heating cables, and the cost of labor and material for bonding the tracers to the pipe are eliminated.

Since the heat output is spread evenly over a three inch wide surface, that heat density is low, for example, 1 watt per square inch, eliminating coking or spoilage due to overheating or particularly hot spots. After a shutdown, the heat is gradually increased so that the temperatutre of a fluid in the pipe is restored without harm to even the most sensitive fluids.

The Teflon or Aclar insulation of the strip has the advantage that it is completely unaffected by weather, corrosive atmosphere, condensate, oils and industrial acids and caustics, and that the material absorbs no water. Due to these properties of the insulating layers of the heating strip, the same is practically unaffected by time.

Due to the fact that the source of voltage need be connected only to one end of the strip, any length of pipe can be heated by a correspondingly long strip attached thereto, while only the portion of the pipe where the connector 4 is located, must be disposed to be accessible for service and repair. Access is facilitated by the cutout 2a in the insulating material 2, and as shown in FIG. 2, a thinner layer of insulating material 2b is placed in cutout 3a and has a thickness that the connector part 4b projects above insulating layer 2b. Since the electrical connections in the region of connector 4 produce additional heat, a thinner thermo-insulating layer 2b is sufficient.

Figure 5:
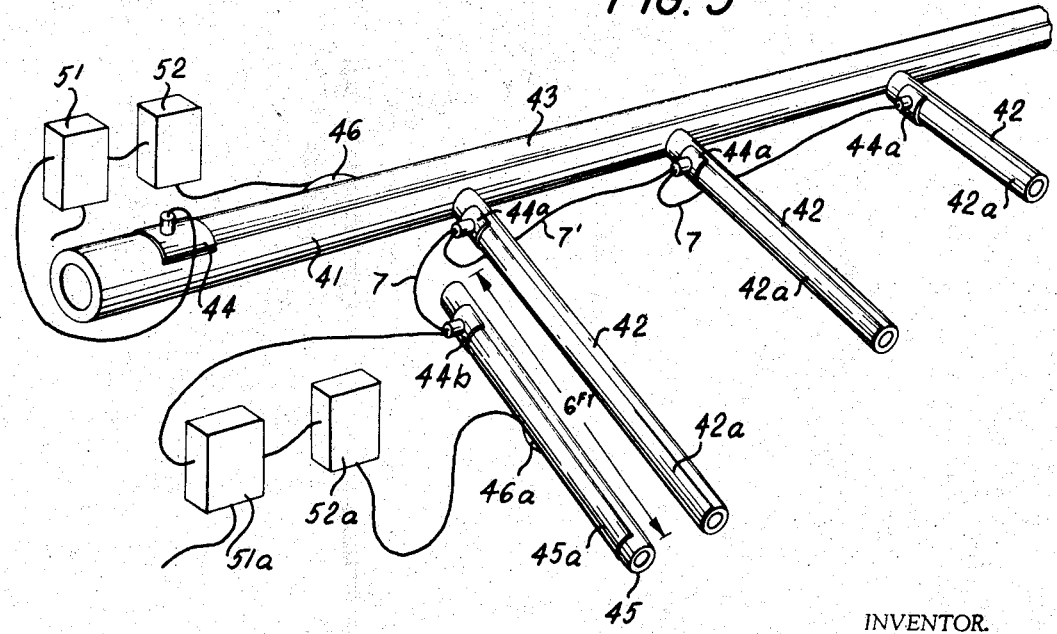
FIG. 5 is a perspective view illustrating a further embodiment of the invention.

FIGS. 3, 4 and 5 illustrate different layouts in accordance with the present invention in a simplified manner, omitting the insulating material 2 for the sake of clarity.

As shown in FIG. 3, two pipe sections 11a and 11b are separated by a valve 10. A by-pass section 11c connects pipe sections 11a and 11b. Pipe section 11a has a heating strip 13a secured thereto by straps, not shown, and a connector means 14a at one end of strip 13a is connected by a wire means 14b to a switching means 20 connected by a wire 20a to a source of voltage, not shown. Wire means 14b corresponds to wire 7 in FIG. 1, and comprises two wires connected to the electrodes of the heating strip.

A thermostat bulb 6, also shown in FIG. 1, is connected by a thermostat capillary 6a to thermostat 21 which is electrically connected with switching means 20 and controls the same. When the temperature sensed by thermostat bulb 6 exceeds a selected temperature, thermostat 21 causes disconnection of the switch means 20 so that no current flows through wire means 14b to connector means 14a.

Heating strips 13c are placed on the three sections of by-pass pipe 11c, and each strip 13c has connector means 14c at the ends thereof which are connected to each other by jumper wires 14d. One connector means 14c is connected by a jumper wire 14e to the connector means 14f at the other end of heating strip 13a. The connector means 14b at one end of heating strip 13b is also connected by a jumper wire to the connector means 14g at the end of the by-pass pipe 11c. Only one wire, corresponding to wire 7 in FIG. 7, has to be inserted into each connector means.

Although all pipe sections are uniformly heated by the heating strips, only connector means 14a has to be connected to the switching means 20.

In the embodiment of FIG. 3, thermostat 6 is placed on the heating strip of a pipe through which the fluid flows. If the layout of the pipe system includes branch pipes, a fluid or liquid may enter one branch pipe at a high temperature which may be sensed by a thermostat bulb on the respective branch pipe, causing disconnection of all heating strips although in other pipe sections the fluid or liquid is cooler. Under such circumstances, the fluid or liquid in the other pipe sections may freeze, whereas the thermostat would respond to the higher temperature of fluid entering the system through one sensed branch pipe.

This disadvantage is overcome by the arrangements illustrated in FIGS. 4 and 5. Branch pipes 32 are connected to a pipe 31 between pipe sections 31a. Heating strips 33 are provided on each pipe section and have connector means 34 connected to other connector means by jumper wire means 7, 7'. A length of pipe 35 is connected to pipe 31 at one end, and closed at theother end. Since pipe 35 communicates with pipe 31 it is filled with the liquid flowing through the same, however, the liquid does not move in pipe 35. Pipe 35 has a heating strip 33 connected by jumper wire means 7' to the first connector means 34 on pipe 31, and this connector means is also connected to the switch means 20 through which current is supplied from a voltage source under the control of the thermostat means 31 whose thermostat bulb 36 is disposed on heating strip 33 of pipe 35. It is also possible to immerse the thermostat bulb 36 in the fluid contained in pipe section 35.

In the arrangements shown in FIGS. 4 and 5, the electrodes of each heating strip 33 are connected to two pairs of wires 7a, 7a', as explained with reference to FIG. 1. A wire means 7 supplies current to the connector on section 31a, and the current flows from there through wire means 7' to the connector on section 35.

The temperature maintained by the thermostat means 21, 36 and the switching means 20 in all pipes will correspond to the temperature of the non-moving fluid in pipe section 35, and cannot be influenced by fluid flowing through a branch pipe into the pipe system at a high temperature.

Referring now to the embodiment of FIG. 5, a plurality of branch pipes 42 are connected to a main pipe 41. A heating strip 43 extends along the length of main pipe 41 and has at one end a connector means 44 connected by a wire means to a switching means 51 controlled by a thermostat means 52 whose thermostat bulb 46 is located on the heating strip 43. Consequently, the heating strip 43 will be switched on and off in accordance with the temperature sensed by thermostat 46.

Connectors 44a of the heating strips 42a of branch pipes 42 are connected to each other by jumper wire means 7, 7' and one connector 44a is connected by a jumper wire means 7 to the connector 44b at one end of a heating strip 45a which is disposed on a short length of pipe 45 closed at both ends and containing the same fluid which flows through pipes 41 and 42. Connector 44b is electrically connected to switching means 51a controlled by a thermostat means 52a having a thermostat bulb 46a disposed on heating strip 45a.

Due to the fact that the branch pipes 42 are of a lesser diameter than the main pipe 41, the fluid in the branch pipes will have a different temperature than the fluid flowing in main pipe 41. Therefore, independent switching and thermostat means are provided for the main pipe 41 and for the branch pipes 42. It would be possible to provide a thermostat bulb on one of the branch pipes, but since fluid entering the respective sensed branch pipe may have a higher temperature than the fluid in other branch pipes, the switching means may be improperly operated, and consequently it is preferred to provide the closed pipe section 45 whose non-moving fluid will have the lowest temperature of all pipes. Therefore, the thermostat means 52a and the switching means 51a will reliably maintain the temperature at such a height that freezing of the fluid in any branch pipe is prevented.

It will be understood that each of the elements described above, or two or more together, may also find a useful application in other types of pipe heating arrangements differing from the types described above.

While the invention has been illustrated and described as embodied in a thermostat controlled pipe heating arrangement incorporating electric heating elements through which the current flows across the length of the heating element and the pipe, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A pipe heating arrangement comprising, in combination, metallic pipe means adapted to contain a fluid; a thermal insulating means surrounding said pipe means and having a cutout at one end; a thin flat elongated heating strip including a thin resistance element, a pair of elongated electrodes electrically connected with said resistance element so that current flows transversely through said resistance element across the length of the same, electrical insulating means surrounding and substantially coextending with said resistance element and electrodes, and connector means at one end of said strip and having terminals connected with said electrodes, respectively, said strip being disposed inwardly of said thermal insulating means on the surface of said metallic pipe means extending along the length of the same and said electrical insulating means insulating said heating strip from said metallic pipe means, and said connector means being located at one end of said pipe means in said cutout so that access to only said one point of said pipe means is sufficient for connecting said connector means to a voltage source so as to effect heating of said pipe means along the entire length thereof; and means for attaching said strip to said pipe means.

2. A pipe heating arrangement comprising, in combination, metallic pipe means adapted to contain a fluid; a thin flat elongated heating strip including a thin resistance element, a pair of elongated electrodes electrically connected with said resistance element so that current flows transversely through said resistance element across the length of the same, electrical insulating means surrounding and substantially coextending with said resistance element and electrodes, and connector means at one end of said strip and having terminals connected with said electrodes, respectively, said strip being disposed on the surface of said metallic pipe means extending along the length of the same and said electrical insulating means insulating said heating strip from said metallic pipe means, and said connector means being located at one point of said pipe means; switching means connected to said connector means and adapted to be connected to a voltage source; thermal insulating means surrounding said pipe means and, said heating strip so as to minimize heat radiation from said pipe means and said heating strip; and thermostat means located intermediate said pipe means and said thermal insulating means and connected to said switching means for controlling the same.

3. A pipe heating arrangement comprising, in combination, metallic pipe means adapted to contain a fluid; a thermal insulating means surrounding said pipe means and having a cutout at one end; a thin flat elongated heating strip including a thin resistance element, a pair of elongated electrodes electrically connected with said resistance element so that current flows transversely through said resistance element across the length of the same, electrical insulating means surrounding and substantially coextending with said resistance element and electrodes, and connector means at one end of said strip and having terminals connected with said electrodes, respectively, said strip being disposed inwardly of said thermal insulating means on the surface of said metallic pipe means extending along the length of the same and said electrical insulating means insulating said heating strip from said metallic pipe means, and said connector means being located at one end of said pipe means in said cutout; switching means connected to said connector means and adapted to be connected to a voltage source; thermostat means disposed inwardly of said thermal insulating means to respond only to the temperature of said fluid and connected with said switching means for controlling the same whereby access to only said one point of said pipe means is sufficient for connecting said switching means with said connector means so as to effect heating of said pipe means at a constant temperature along the entire length thereof; and means for attaching said strip to said pipe means.

References Cited

UNITED STATES PATENTS

| 2,274,839 | 3/1942 | Marick | 219—301 X |
| 2,519,920 | 8/1950 | Miner | 219—301 |
| 2,843,717 | 7/1958 | Tracy | 219—296 X |
| 3,120,600 | 2/1964 | True | 219—301 |

FOREIGN PATENTS 531,068  10/1921  France.

RICHARD M. WOOD, *Primary Examiner.*
C. L. ALBRITTON, *Assistant Examiner.*